(12) United States Patent
Takeuchi

(10) Patent No.: US 9,948,906 B2
(45) Date of Patent: Apr. 17, 2018

(54) MONITORING DEVICE AND INTERFERENCE DETECTION METHOD

(75) Inventor: Hideto Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1466 days.

(21) Appl. No.: 12/625,659

(22) Filed: Nov. 25, 2009

(65) Prior Publication Data
US 2010/0128126 A1 May 27, 2010

(30) Foreign Application Priority Data

Nov. 27, 2008 (JP) ................................ P2008-302280

(51) Int. Cl.
*H04N 7/18* (2006.01)
*G08B 13/196* (2006.01)
*G08B 29/04* (2006.01)

(52) U.S. Cl.
CPC ......... *H04N 7/188* (2013.01); *G08B 13/1961* (2013.01); *G08B 29/046* (2013.01)

(58) Field of Classification Search
CPC .............. G08B 13/1961; G08B 29/046; G08B 13/19671; G08B 13/19686; G08B 13/19697; G08B 29/04; H04N 7/188; H04N 7/181; H04N 7/185
USPC ......... 348/135–172; 382/106, 107, 286, 294, 382/299, 300, 308, 190, 192, 194, 195, 382/205, 209, 217–220, 224, 225, 254,
(Continued)

(56) References Cited

U.S. PATENT DOCUMENTS

| 7,433,588 B2* | 10/2008 | Oya ....................... G03B 15/16 348/143 |
| 2003/0202102 A1* | 10/2003 | Shiota .............. G08B 13/19608 348/159 |

(Continued)

FOREIGN PATENT DOCUMENTS

| JP | 11 150677 | 6/1999 |
| JP | 11 242523 | 9/1999 |

(Continued)

OTHER PUBLICATIONS

Aksay et al., Camera Tamper Dectection Using Wavelet Analysis for Video Surveillance, 2007, IEEE Conference on Advanced Video and Signal Based Surveillance, pp. 558-562.*

(Continued)

*Primary Examiner* — Jessica M Prince
(74) *Attorney, Agent, or Firm* — Haug Partners LLP; William S. Frommer

(57) ABSTRACT

A monitoring device that includes an imaging unit which images an image, a turning unit which turns an angle of the imaging unit between a plurality of predetermined positions, an interference detection unit which detects an interference action based on an image sequence imaged in one of the plurality of predetermined positions. A past image storage unit stores an image imaged before the imaging unit turns, and a turning-period interference detection unit detects an interference action in a period the imaging unit turns, using the image imaged in a predetermined position before the imaging unit turns and the image stored in the past image storage unit, when the imaging unit turns after the past image storage unit stores the image, and turns back to a predetermined position before its turn.

7 Claims, 10 Drawing Sheets

(58) Field of Classification Search
USPC ........ 382/276, 278, 104–105, 116, 119–123, 382/103
See application file for complete search history.

(56) References Cited

U.S. PATENT DOCUMENTS

| | | | | |
|---|---|---|---|---|
| 2007/0126869 | A1* | 6/2007 | Montminy | G06T 7/0004 348/143 |
| 2007/0230798 | A1* | 10/2007 | Naylor et al. | 382/219 |
| 2007/0247526 | A1* | 10/2007 | Flook | G03B 17/18 348/161 |
| 2008/0152232 | A1* | 6/2008 | Skans | G08B 29/046 382/209 |
| 2008/0317356 | A1 | 12/2008 | Itoh et al. | |

FOREIGN PATENT DOCUMENTS

| | | |
|---|---|---|
| JP | 2000 194969 | 7/2000 |
| JP | 2000 222646 | 8/2000 |
| JP | 2001 54100 | 2/2001 |
| JP | 2001 238204 | 8/2001 |
| JP | 2001 333417 | 11/2001 |
| JP | 2002 304677 | 10/2002 |
| JP | 2002 304680 | 10/2002 |
| JP | 2005 20184 | 1/2005 |
| JP | 2005 510148 | 4/2005 |
| JP | 2005 517250 | 6/2005 |
| JP | 2005 252479 | 9/2005 |
| JP | 2007 303913 | 11/2007 |
| JP | 2007 318480 | 12/2007 |
| JP | 2008 77517 | 4/2008 |
| JP | 2008 167429 | 7/2008 |
| JP | 2009 5198 | 1/2009 |
| WO | WO 03 067522 | 8/2003 |

OTHER PUBLICATIONS

Aksay et al., Camera Tamper Detection Using Wavelet Analysis for Video Surveillance, 2007 IEEE Conference on Advanced Video and Signal Based Surveillance, pp. 558-562.*

Aksay et al., Camera Tamper Detection Using Wavelet Analysis for Video Surveillance, 2007, IEEE Conference on Advanced Video and Signal Based Surveillance, pp. 558-552.*

Aksay et al., Camera Tamper Detection Using Wavelet Analysis for Video Surveillance, 2007, IEEE Conference on Advanced Video and Signal Based Surveillance, pp. 558-562.*

Aksay et al. "Camera Tamper Detection Using Wavelet Analysis for Vdieo Surveillance" 2007, IEEE Conference4 on Advanced Video and Signal Based Surveillance, pp. 558-562.*

* cited by examiner

MONITORING DEVICE AND INTERFERENCE DETECTION METHOD

BACKGROUND OF THE INVENTION

1. Field of the Invention

The present invention relates to a monitoring device and an interference detection method.

2. Description of the Related Art

In recent years, increased awareness of crime-prevention has lead to the installation of monitoring devices, such as security cameras or the like, in a variety of places. For example, the monitoring devices are installed, in houses, at the entrance of shops, garages, warehouses and also street corners of downtown area and the like. Such monitoring devices include fixed type monitoring devices and adjustable type monitoring devices in accordance with their use or locations. The fixed monitoring device has a camera having a fixed angle, while the adjustable monitoring device has casing or a built-in camera which has a variable angle. However, in fact, in many cases, the fixed monitoring device includes a pan-tilt mechanism mounted therein, and the adjustable monitoring device includes a camera with an adjustable angle.

As is generally known, crime-prevention can effectively be attained by installation of the monitoring device. However, once a tampering action is done with the monitoring device, the crime-prevention does not effectively be achieved. The tampering action on the monitoring device includes, for example, an action of changing the angle of the monitoring device, an action of blocking the field of vision with a cover or by spraying paint on the camera of the monitoring device, and the like. Further, when a zoom mechanism is mounted in the camera of the monitoring device, there may be a tampering action, such as shifting the focus by tampering with the zoom mechanism. To cope with such a tampering action, many monitoring devices have a function for generating a warning for a monitoring person, upon detection of the tampering action.

As for a technique for detecting tampering actions, for example, U.S. Pat. No. 3,910,749 describes a method for detecting the tampering actions based on a luminance value of a captured image. According to the method described in this document, a luminance value of each pixel area is compared with a predetermined luminance value, so as to detect (determine) the existence of a tampering action when the number of pixel areas having a luminance value greater than a predetermined luminance value is equal to or greater than a predetermined value. Japanese Patent Application Laid-Open (JP-A) No. 2005-252479 describes a tampering action detecting method. According to this method, the amount of characteristic of a predetermined reference image is compared with the amount of characteristic of a captured image, thereby detecting a tampering action based on disagreement of both amounts and a change of the passage of time. Particularly, the method described in JP-A No. 2005-252479 is to detect the existence of a tampering action based on a difference in edge strengths of both images.

JP-A No. 2001-238204 discloses a method for detecting whether there is a decrease in signal components of 2 to 5 MHz included in a captured image, and detecting a tampering action based on the detection result. Further, JP-A No. 2001-333417 discloses a method for extracting pixel areas, and detecting a tampering action based on a change of the passage of time of the extracted areas. In this case, in the pixel areas, a deviation of each pixel with respect to the average luminance of a captured image is greater than a predetermined threshold value, and a difference of an input image from the background image is greater than a predetermined threshold value. The method of JP-A No. 2001-333417 relates to a technique for decreasing the occurrence frequency of mis-detection of a tampering action resulting from an environmental change. Following JP-A No. 2008-77517 describes a method for comparing the luminance value of a captured image and the luminance value of a reference image in association with each pixel, and detecting whether a sudden change is made in the captured image based on the comparison result.

SUMMARY OF THE INVENTION

Accordingly, active researches and developments have forwarded in many fields, regarding a technique for detecting a tampering action on the monitoring device. However, the methods described in the documents are to be effectively realized in a state where the monitoring device is at rest. Normally, the adjustable monitoring device moves between predetermined pan-tilt positions. This movement operation may be called a "tour". During the movement, even if the monitoring device performs capturing operation, it is difficult to detect a tampering action based on a captured image, due to distortion of the captured image during the movement of the camera.

When the tampering action detection method described in each of the above documents is applied to the adjustable monitoring device, the detection method is executed while the monitoring device is at rest in a predetermined position. Thus, if a tampering action is made while the adjustable monitoring device performs a tour operation, this tampering action is not detected, even using any of the above-described methods.

The present invention has been made in consideration of the above, and it is desirable to provide a new and improved monitoring device and interference detection method, enabling to detect a tampering action performed during a tour operation.

According to an embodiment of the present invention, there is provided a monitoring device includes an imaging unit which images an image, a turning unit which turns an angle of the imaging unit between a plurality of predetermined positions, an interference detection unit which detects an interference action based on an image sequence imaged in one of the plurality of predetermined positions, a past image storage unit which stores an image imaged before the imaging unit turns, and a turning-period interference detection unit which detects an interference action in a period the imaging unit turns, using the image imaged in a predetermined position before the imaging unit turns and the image stored in the past image storage unit, when the imaging unit turns after the past image storage unit stores the image, and turns back to a predetermined position before its turn.

The interference detection unit may include a high frequency filter which extracts a high frequency component from an image imaged in the one of the plurality of positions and an interference action determination unit which determines that there is an interference action, when a value of the high frequency component extracted by the high frequency filter is lower than a predetermined value.

The interference detection unit may further include a moving object detection unit which detects an area including a moving object based on the image sequence imaged in the one predetermined position. Furthermore, the interference action determination unit may determine that there is an interference action, when a value of the high frequency component corresponding to the area detected by the moving object detection unit is lower than a predetermined threshold value.

The past image storage unit may transform an image used for detecting an interference action by the interference detection unit, into an image with a low resolution, and stores the transformed image. Furthermore, the turning-period interference detection unit may detect an interference action performed while the imaging unit turns, using the image having the low resolution and stored in the past image storage unit.

The turning-period interference detection unit may adjust a position of the image imaged in the predetermined position before the turn and a position of the image stored in the past image storage unit, thereafter comparing both of the images so as to detect an interference action while the imaging unit turns.

According to another embodiment of the present invention, there is provided a monitoring device include an imaging unit which images an image, a moving object detection unit which detects a moving object based on an image sequence imaged by the imaging unit, a high frequency filter which extracts a high frequency component from the image imaged by the imaging unit, and an interference action determination unit which determines that there is an interference action, when a value of the high frequency component extracted by the high frequency filter is lower than a predetermined value, or when number of moving objects detected by the moving object detection unit is larger than a predetermined value.

According to another embodiment of the present invention, there is provided an interference detection method including the steps of imaging an image in one of a plurality of positions, by an imaging unit which can image an image while turning between the plurality of positions, detecting an interference action based on an image sequence imaged in the one of the plurality of positions, storing an image imaged before the imaging unit turns, when the imaging unit turns from the one of the plurality of positions to another one of the plurality of positions, and detecting an interference action while the imaging unit turns based on the image imaged in a predetermined position before the image unit turns and the image stored in the step of storing the image, when the imaging unit turns to the another predetermined position after the image is stored in the step of storing, and turns back to a predetermined position before its turn.

According to another embodiment of the present invention, there is provided an interference detection method including the steps of imaging an image, detecting a moving object based on an image sequence imaged in the step of capturing, extracting a high frequency component from the image imaged in the step of detecting, and determining that there is an interference action, when a value of the high frequency component extracted in the step of extracting is lower than a predetermined threshold value, or when number of moving objects detected in the step of detecting is larger than a predetermined threshold value.

According to another embodiment of the present invention, there is provided a program to cause a computer to realize functions held by the above-mentioned monitoring device. Further, a computer readable recording medium in which the program is recorded may be provided.

As explained above, according to the present invention, it is possible to detect a tampering action performed during a tour operation.

DETAILED DESCRIPTION OF THE EMBODIMENT

Figure 1:
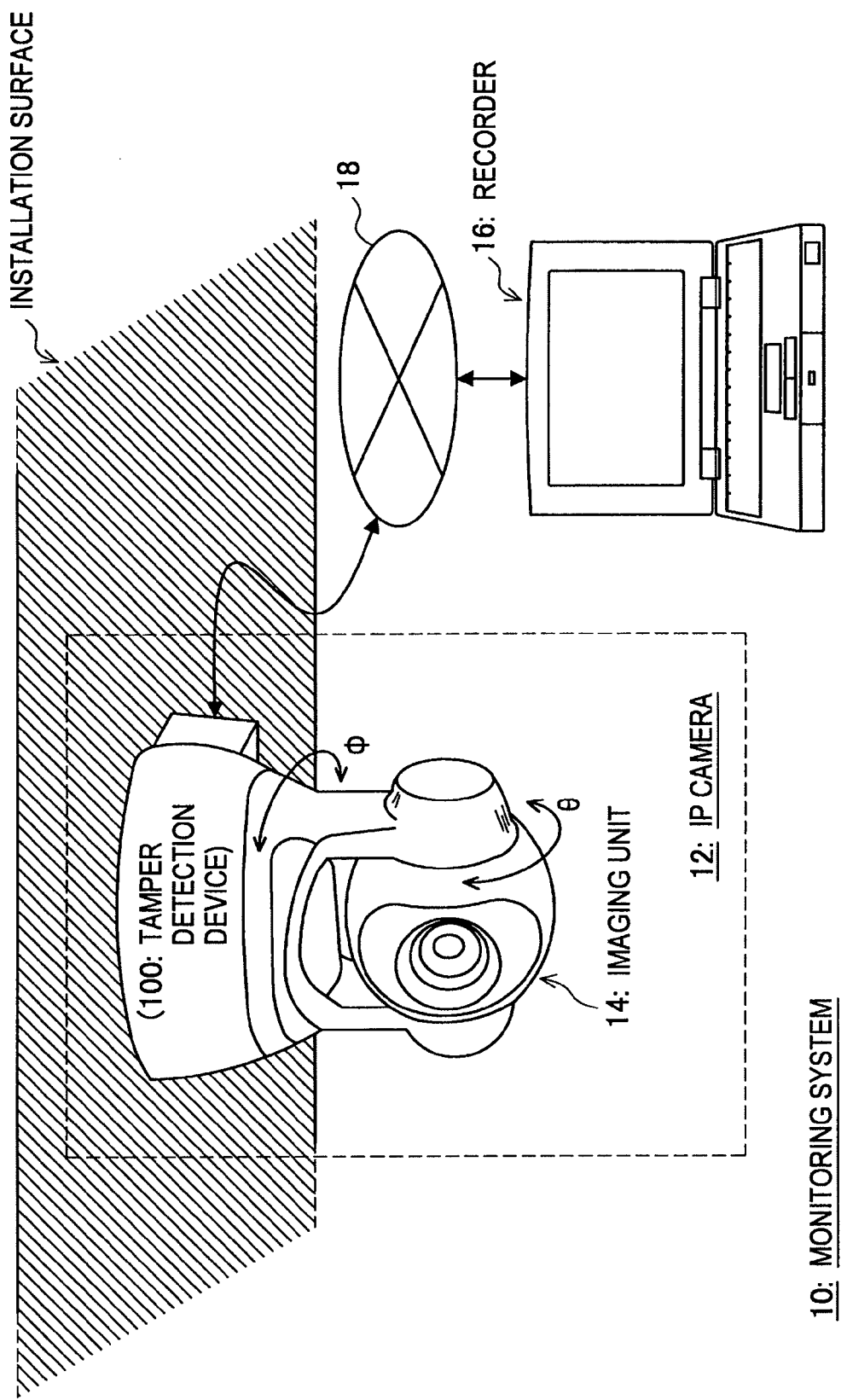
FIG. 1 is an explanatory diagram showing a system configuration example of a monitoring system according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

[About Sequence of Descriptions]

Brief descriptions will now be made to the sequence of descriptions regarding embodiments of the present inventions, as will be described below. First, descriptions will be made to an entire configuration and an installation mode of a monitoring system 10 according to this embodiment, with reference to FIG. 1. Next, descriptions will be made briefly to a device configuration of each of an IP camera 12 and a recorder 16 included in the monitoring system 10 according to this embodiment, with reference to FIG. 2. Then, descriptions will be made to a functional configuration of a fixed tamper detection device 100 according to this embodiment, with reference to FIGS. 3 to 5. Subsequently, descriptions will be made to a functional configuration of a fixed tamper detection device 200 according to one modification of this embodiment, with reference to FIG. 6.

Figure 7:
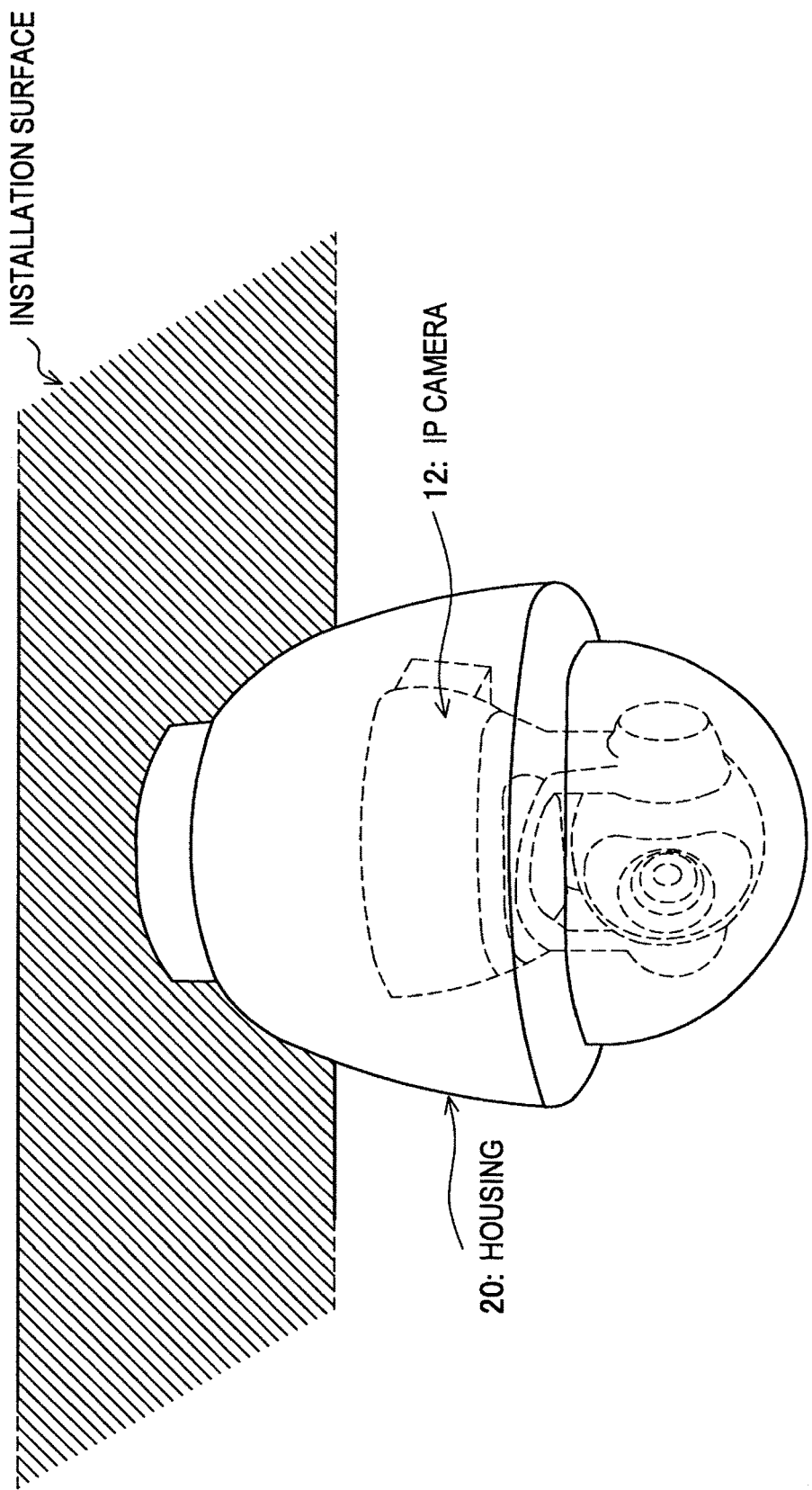
FIG. 7 is an explanatory diagram showing an installation example of an IP camera according to this embodiment.

Descriptions will now be made to the issues to be solved by an adjustable tamper detection device 300 according to this embodiment, with reference to FIGS. 7 and 8. Descriptions will now be made to a functional configuration of the adjustable tamper detection device 300 according to this embodiment, with reference to FIG. 9. This adjustable tamper detection device 300 is formed in an adjustable type by combining a pan-tilt mechanism with the fixed tamper detection devices 100 and 200. Further, a new idea is given to the adjustable tamper detection device 300 in order to solve the issues, shown in FIGS. 7 and 8. Then, descriptions will be made to an interference detection method according to this embodiment, with reference to FIG. 10. Finally, the technical ideas of this embodiment are summarized, and descriptions will be made briefly to a functional effect obtained by the technical ideas.
(Description Items)
 1: Schematic description of monitoring system 10
 2: About functional configuration of fixed tamper detection devices 100 and 200
  2-1: Fixed tamper detection device 100
  2-2: (Modification) Fixed tamper detection device 200
 3: About functional configuration of adjustable tamper detection device 300
  3-1: Issue of adjustable monitoring device
  3-2: Functional configuration of adjustable tamper detection device 300
  3-3: Interference detection method by adjustable tamper detection device 300
 4: Summary Embodiment An embodiment of the present invention will now be described. This embodiment relates to a technique for enhancing detection accuracy of a tampering action made while a monitoring device is at rest, and a technique for detecting a tampering action made while the monitoring device is moved. In this embodiment, when a tampering action of shifting the focus by tricking a zoon mechanism, a proposed technique is to detect the tampering action with high accuracy. Further, in this embodiment, a proposed technique is to detect the tampering action of obstructing the field of a camera with paints or the like, during the movement of the monitoring device.

1: SCHEMATIC DESCRIPTION OF MONITORING SYSTEM 10

Figure 2:
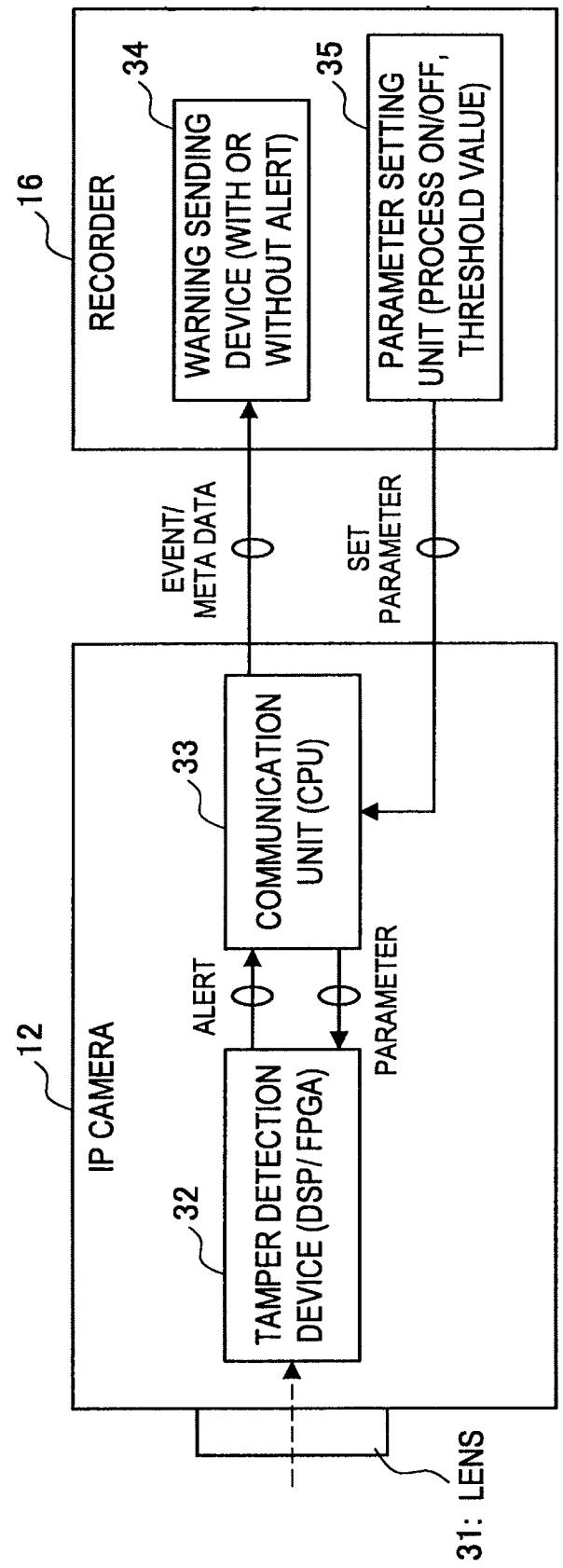
FIG. 2 is an explanatory diagram showing a schematic functional configuration example of a monitoring system according to this embodiment.

Descriptions will now schematically be made to a configuration of the monitoring system 10 according to this embodiment, with reference to FIGS. 1 and 2. FIG. 1 is an explanatory diagram showing the entire system configuration example of the monitoring system 10 according to this embodiment. FIG. 2 is an explanatory diagram showing a device configuration example of each of an IP camera 12 ad a recorder 16 included in the monitoring system 10 according to this embodiment.
(Entire Configuration)
Descriptions will now be made with reference to FIG. 1. As shown in FIG. 1, the monitoring system 10 is configured to include the IP camera 12, the recorder 16 and a network 18. The IP camera 12 has an imaging unit 14 that captures an image in a monitoring area. The IP camera 12 is connected to the recorder 16 through the network 18. The IP camera 12 has various tamper detection devices mounted thereon, as will be described later. The example of FIG. 1 shows an adjustable type IP camera 12 which can turn at angles θ and φ. However, the same system configuration is used even in the fixed type one, except its turning mechanism.

The monitoring system 10 is used, for example, for detecting an object that enters the monitoring area. In this case, for example, when the IP camera 12 detects the object that has entered the monitoring area, an image of the object is recorded in the recorder 16 connected through the network 18. Upon detection of the entrance of the object, an alarm is sent to a monitoring person from the IP camera 12. This detection of the entering object is performed based on a luminance change in the pixel area (hereinafter referred to as an object area) corresponding to the entering object. This detection process employs a difference detection method, a background difference method or the like.

The difference detection method is to detect an object area using an interframe difference of captured image frames. In the difference detection method, calculated is a difference value between the luminance value of a frame captured at the current time and the luminance value of a frame captured before a unit time, at each pixel or at each pixel area having a predetermined size. When the calculated difference value is equal to or larger than a predetermined value, it is determined that the pixel or the pixel area is the object area. In this manner, in the difference detection method, the object area is detected using the inter-frame difference value. On the other hand, according to the background difference method, an image without an object is stored, and an object area is detected by comparing a captured image with a background image at the monitoring stage.

However, if a tampering action is made for the IP camera 12, the imaging unit 14 is not able to capture an image. In this case, an object entering the monitoring area is not possibly detected. For example, if the angle of the IP camera 12 is changed, if the IP camera 12 is covered with a piece of cloth, if the imaging unit 14 is spray-painted by a spray, or if the focus of the imaging unit 14 is changed, the IP camera 12 is not able to detect the object area. To cope with this tampering action, the IP camera 12 has a tamper detection device for detecting such a tampering action. When the tamper detection device detects a tampering action, the IP camera 12 sends an alert to the recorder 16.
(Individual Device Configuration)
Descriptions will now be made with reference to FIG. 2. FIG. 2 shows a device configuration of the IP camera 12 and the recorder 16 involved with a process for detecting a tampering action. As shown in FIG. 2, the IP camera 12 has a lens 31 provided on the imaging unit 14, a tamper detection device 32 and a communication unit 33. The recorder 16 has a warning sending device 34 and a parameter setting unit 35.

A subject image (hereinafter referred to as a captured image) in the monitoring area captured using the lens 31 is input to the tamper detection device 32. The tamper detection device 32 executes an imaging process for detecting a tampering action using the input captured image. The imaging process by the tamper detection device 32 is executed by a DSP or FPGA or the like that is mounted on the IP camera 12. The DSP stands for "Digital Signal Processor", while the FPGA stands for "Field Programmable Gate Array". When the tamper detection device 32 detects the tampering action, an alert is generated through the communication unit 33. This alert is sent to the recorder 16 in the form of an event or meta-data. When the IP camera 12 sends an alert to the recorder 16, the warning sending device 34 provided in the recorder 16 sends a warning to the monitoring person.

A parameter used in the process for detecting a tampering action (hereinafter referred to as a tamper detection process) by the tamper detection device 32 can be set on the side of the recorder 16. This process for setting the parameter is executed by the parameter setting unit 35. The parameter setting unit 35 can set a parameter, for example, for setting whether to execute the tamper detection process. Further, the parameter setting unit 35 can set a parameter for showing various threshold values used for the tamper detection process. The parameter set by the parameter setting unit 35 is sent to the communication unit 33 of the IP camera 12, and is input to the tamper detection device 32 through the communication unit 33. The tamper detection device 32 executes the tamper detection process based on the parameter set by the recorder 16.

As described above, the monitoring system 10 is configured to include the IP camera 12 and the recorder 16 that are connected with each other through the network 18 so as to exchange information regarding the tamper detection process and its processing result. The distinctive feature of this embodiment in the monitoring system 10 is the function of the tamper detection device 32. However, in the above descriptions, the entire system configuration of the monitoring system 10 is briefly described. In the following descriptions, with a mind to the system configuration of the monitoring system 10, descriptions will now specifically be made to functions of the fixed tamper detection devices 100 and 200 which is used as the tamper detection device 32 and the adjustable tamper detection device 300.

2: ABOUT FUNCTIONAL CONFIGURATION OF FIXED TAMPER DETECTION DEVICES 100 AND 200

Descriptions will now be made to the functional configuration of the fixed tamper detection devices 100 and 200 according to this embodiment. The fixed tamper detection device 200 is a modification of the fixed tamper detection device 100.

(2-1: Fixed Tamper Detection Device 100)

Figure 3:
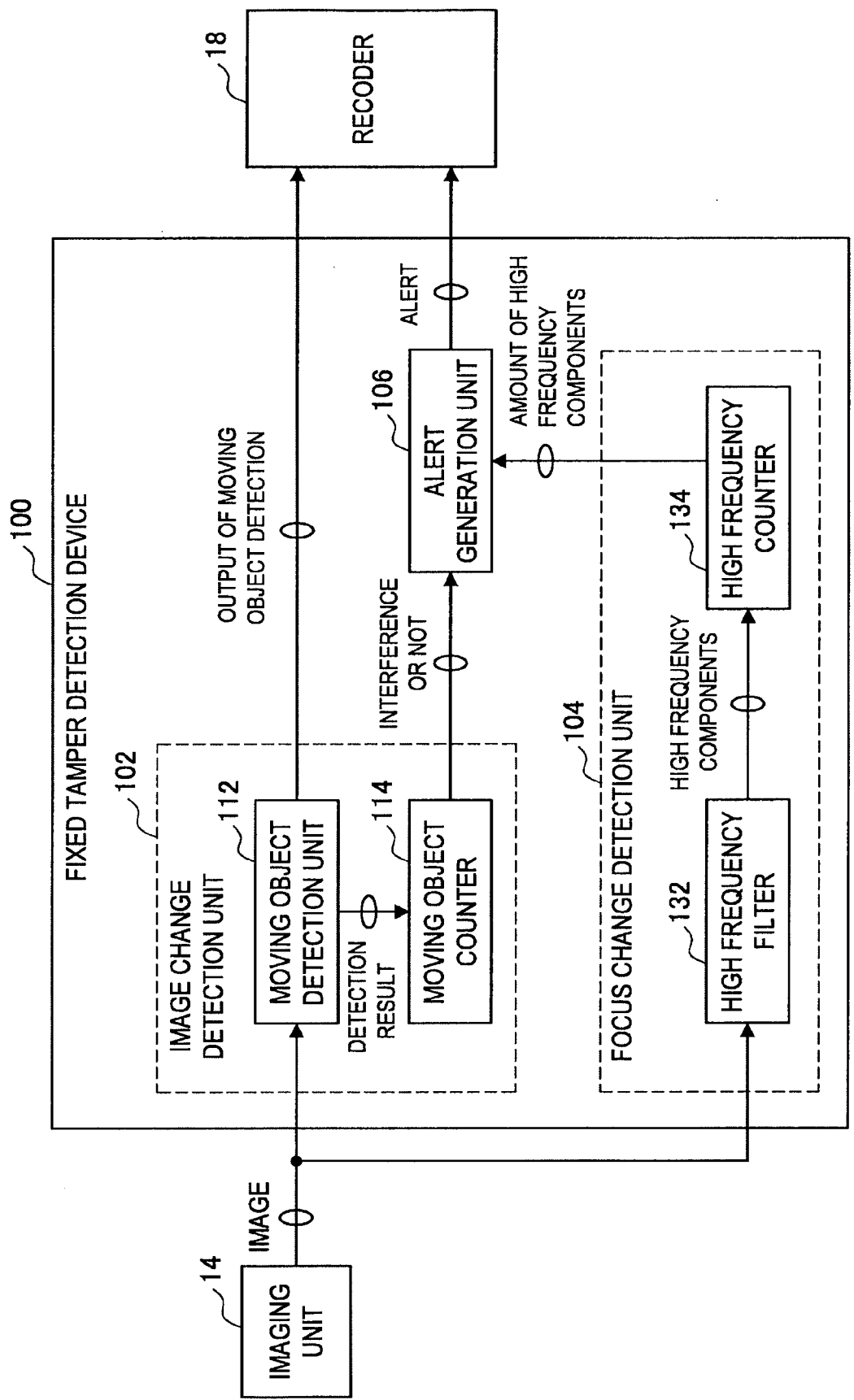
FIG. 3 is an explanatory diagram showing a functional configuration example of a fixed tamper detection device according to this embodiment.

Descriptions will now be made to the functional configuration of the fixed tamer detection device 100 according to this embodiment, with reference to FIG. 3. FIG. 3 is an explanatory diagram showing the functional configuration example of the fixed tamper detection device 100 according to this embodiment.

As shown in FIG. 3, the fixed tamper detection device 100 is configured to include mainly an image change detection unit 102, a focus change detection unit 104 and an alert generation unit 106. The image change detection unit 102 is to detect a tampering action of moving the angle of the camera or obstructing the field of the camera. In the following descriptions, tamper detection by the image change detection unit 102 may be called "Global Motion detection". The focus change detection unit 104 is to detect the tampering action (Defocus detection) for a zoom mechanism, by analyzing high frequency components of an input image. The alert generation unit 106 is to send an alert to the recorder 16 based on result outputs of the image change detection unit 102 and the focus change detection unit 104. Descriptions will more specifically be made to configurations of the image change detection unit 102, the focus change detection unit 104 and the alert generation unit 106.

(Image Change Detection Unit 102)

The image change detection unit 102 has a moving object detection unit 112 and a moving object counter 114. When an image is input to the image change detection unit 102, the moving object detection unit 112 executes a moving object detection process using the input image, so as to detect a moving object area included in the input image. The moving object area means a pixel area including a moving object, in the unit of pixels or in the unit of blocks with a predetermined size. The detection result by the moving object detection unit 112 is input to the moving object counter 114. The moving object counter 114 counts the number of moving object areas, based on the detection result by the moving object detection unit 112. The number of moving object areas counted by the moving object counter 114 is input to the alert generation unit 106.

(About Moving Object Detection Process)

Descriptions will more specifically be made to the moving object detection process by the moving object detection unit 112. To the moving object detection unit 112, an input time-series image including a plurality of images in time-series is input. The moving object detection unit 112 compares between the plurality of images so as to detect a difference between the images. More specifically, calculated is a difference in the luminance values in each pixel included in the plurality of images or in each block with a predetermined size. The moving object detection unit 112 determines whether the calculated difference value is equal to or greater than a threshold value. When the difference value is greater than a threshold value, it is determined that the pixel (hereinafter, a "target image") or block (hereinafter, a "target block") corresponding to the difference value corresponds to the moving object. On the contrary, when the difference value is lower than a predetermined threshold value, it is determined that the target pixel or target block does not correspond to the moving object.

(About Process for Eliminating Sway)

In the moving object detection process, the sway of tree or the sway in the surface of water may be mis-detected as a moving object. To eliminate the effect of such sway, a temporal change value of the difference value may be referred. When this method is used, it is determined that the target image or target block corresponds to a moving object, when the difference value is equal to or greater than a predetermined threshold value continuously for a predetermined period of time. On the contrary, when the difference value is lower than a predetermined threshold value, or when the state in which the difference value is equal to or greater than a predetermined threshold value is not continuous for a predetermined period of time, it is determined that the target image or target block does not correspond to a moving object. To eliminate the effect of a momentary decrease in the luminance value due to noise or the like, there may be performed a process for ignoring a momentary decrease of the difference value being lower than a predetermined threshold value. For example, it is considered to employ a method using the time mean value of the difference values.

(About Process for Restraining Brightness Variation)

In the moving object detection process, the moving object area may be mis-detected, due to an illumination change, a weather change, or a change in the image brightness. To avoid such a mis-detection, proposed is a method for executing a process for detecting a moving object using a compensated image, after compensating in advance the brightness of a referred image for use in the moving object detection process. For example, when the brightness changes in the entire image, the luminance value of each referred image is corrected so as to obtain the coinciding luminance means values of referred images. When the brightness changes in a part of the image, the difference value between the plurality of images is obtained. At this time, a part of the image with a brightness change is mis-detected as a moving object area. Thus, a correlation process for normalizing the moving object areas is executed based on following equation (1).

[Equation 1]

$$N_i = \sum \frac{I_{ci} \times I_{pi}}{\sqrt{\sum I_{ci} \times I_{ci}} \times \sqrt{\sum I_{pi} \times I_{pi}}} \quad (1)$$

Ni represents a normalization correlation value regarding an "i-th" moving object area that is detected based on the difference value calculation. Ici represents the luminance value of the pixel included in the "i-th" moving object area of the present image. Ipi represents the luminance value of the pixel of the past image in the position same as that of the "i-th" moving object area of the present image. That is, the equation (1) is used for calculating the correlation value, regarding the change in the moving object areas whose positions are changed from one to another. When a moving object is actually included in the moving object area, the correlation decreases. In the case of the moving object area that is mis-detected due to a brightness change, the correlation increases. When this method is employed, the moving object detection unit 112 executes the correlation process in addition to the difference value calculation, determines that the low correlative pixel area is a moving object area, and determines that the high correlative pixel area is a non-moving object area.

(About Process for Eliminating Image Lag)

The descriptions have been made to the moving object detection process and the like executed by the moving object detection unit 112. With those processes, it is possible to combine a process for eliminating an image lag occurring as a result of difference in the moving object detection process. An image lag means a phenomenon that occurs between two images corresponding to preceding and succeeding stages of a moving subject. In particular, a position A before subject's movement and a position B after the movement are detected as moving object areas in both images. For example, it is assumed that an object at a point A in the past image is moved at a point B at the present time. At the point B, no object exists at the past time, while the object exists at the present time. Thus, the point B is detected as the moving object area. At the point A, an object exists at the past time, while no object exists at the present time. Thus, the point A is detected also as the moving object area. That is, the image lag of the object remains at the point A.

Figure 4:
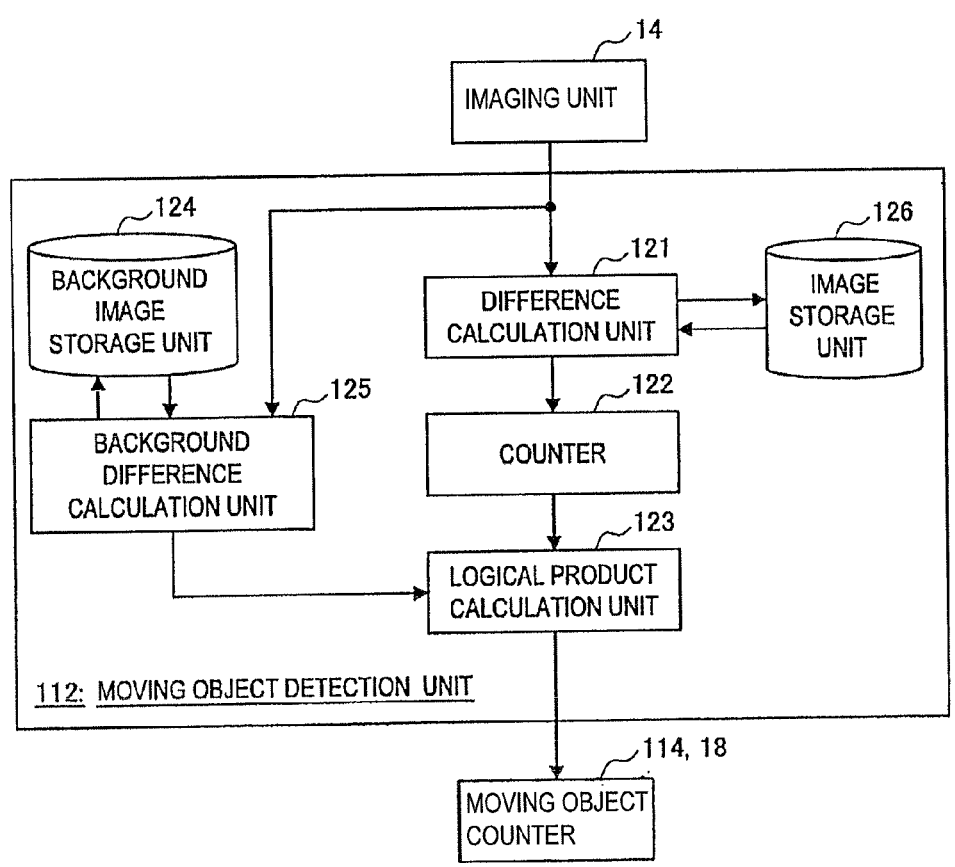
FIG. 4 is an explanatory diagram showing a detailed configuration example of a moving object detecting unit according to this embodiment.

When added this image lag eliminating function, the functional configuration of the moving object detection unit 112 is expressed as shown in FIG. 4. As seen from FIG. 4, the moving object detection unit 112 has, for example, a difference calculation unit 121, a counter 122, a logical product calculation unit 123, a background image storage unit 124, a background difference calculation unit 125 and an image storage unit 126.

After the imaging unit 14 inputs an image to the moving object detection unit 112, the input image is input to the difference calculation unit 121 and the background difference calculation unit 125. While storing images sequentially input from the imaging unit 14 in the image storage unit 126, the difference calculation unit 121 compares the input image at the present time with the past image stored in the image storage unit 126, thereby calculating the luminance difference value of each pixel or each block. The luminance difference value calculated by the difference calculation unit 121 is input to the counter 122. The counter 122 counts the time the luminance difference value is equal to or greater than a predetermined threshold value. Further, the counter 122 detects a pixel or block, whose luminance difference value is equal to or greater than a predetermined threshold value continuously for a predetermined period of time, as a moving object area based on the count value. The detection result of the counter 122 is input to the logical product calculation unit 123.

While storing images that are sequentially input from the imaging unit 14, in the background image storage unit 124, the background difference calculation unit 125 compares an image (to be input) at the present time with the past image stored in the background image storage unit 124, so as to obtain the luminance difference value of each pixel or block. Further, the background difference calculation unit 125 detects a non-moving object area based on the obtained luminance difference value, and generates a background image excluding a moving object area using an image of the detected non-moving object area. The background image generated by the background difference calculation unit 125 is input to the logical product calculation unit 123. As described above, to the logical product calculation unit 123, the detection result of the moving object area and the background image are input. The logical product calculation unit 123 eliminates the image lag of the moving object by obtaining the logical product of the detection result of the moving object area, based on a difference between the detection result of the moving object area and the background image. The detection result of the moving object area that is output from the logical product calculation unit 123 is input to the recorder 16 and the moving object counter 114.

The descriptions have so far been made to the moving object detection process by the moving object detection unit 112.

(About Method for Counting Moving Object Areas Divided into Blocks)

Figure 5:
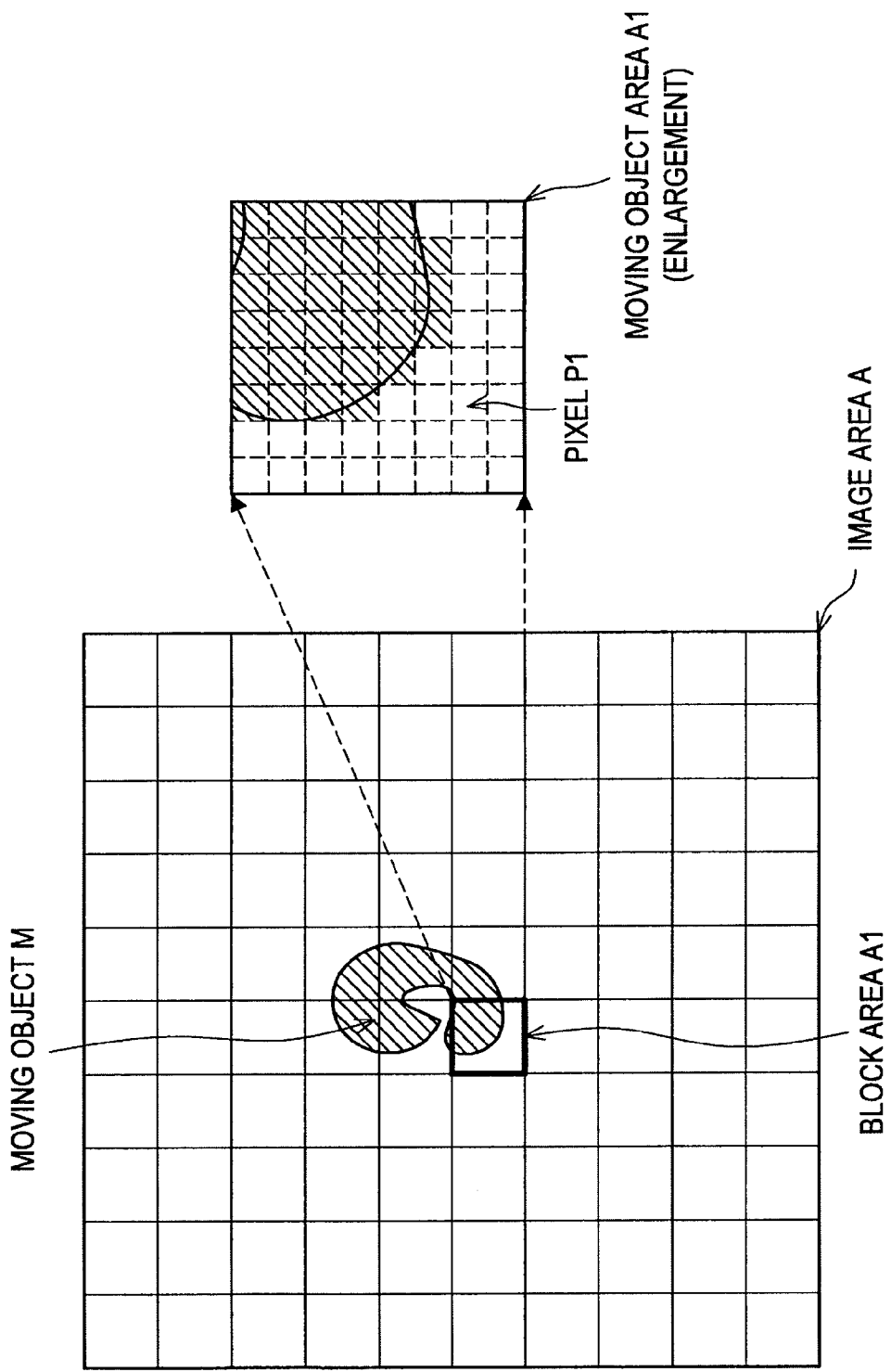
FIG. 5 is an explanatory diagram showing a method of counting moving object areas, according to this embodiment.

Descriptions will now be made to a method for counting moving object areas, performed by the moving object counter 114, with reference to FIG. 5. As described above, the moving object detection unit 112 inputs information regarding a pixel or pixel area whose luminance difference value is greater than a predetermined threshold value. However, for the purpose of tamper detection, in many cases, there is no need to monitor the change in the moving object area in the unit of pixels or in the unit of very small pixel areas. The moving object counter 114 may be configured to divide the image area into block areas with a predetermined size, and to count the number of moving object areas in the unit of divided block areas. FIG. 5 shows an example of this process.

FIG. 5 shows an image area A corresponding to the entire captured image. The image area A is divided into a plurality of block areas A1. The image area A includes a moving object M. The position of this moving object M is detected by the moving object detection unit 112. FIG. 5 shows enlargement of the block area A1 including a part of the moving object M. This enlargement illustration clearly shows that the block A1 is formed of a plurality of pixels P1. In the example of FIG. 5, one block area A1 is formed of sixty-four pixels P1. In the example of FIG. 5, if the number of the moving object areas is counted in the unit of block areas A1, the number of the block areas A1 including the moving object area is 6. On the contrary, if the number of the moving object areas is counted in the unit of pixels P1, the number is 32 in the example of FIG. 5.

The moving object counter 114 counts the number of the moving object areas in the unit of, as described above, block areas A1 or pixels, for example. Further, the moving object counter 114 determines whether the counted number of the moving object areas is equal to or greater than a predetermined threshold value. When the number of the moving object areas is equal to or greater than a predetermined threshold value (e.g. 50% or greater), the moving object counter 114 informs the alert generation unit 106 about the existence of a tampering action, as a result of the Global Motion detection. The threshold value (hereinafter, a "moving object area number threshold value") for use in the determination process by the moving object counter 114 can be set through the parameter setting unit 35 of the recorder 16. The threshold value can suitably be set, depending on the installation location or monitoring purposes.

The specific descriptions have so far been made to the function of the image change detection unit 102. Descriptions will now be made to a function of the focus change detection unit 104 with reference to FIG. 3.

(Focus Change Detection Unit 104)

The focus change detection unit 104 includes a high frequency filter 132 and a high frequency counter 134. When an image is input to the focus change detection unit 104, the high frequency filter 132 extracts high frequency components included in the input image. For example, if a transmission function H of the high frequency filter 132 is z-transformed, it is expressed by the following equation (2). For simple expressions, this equation is expressed in one dimension. However, the input image is in two dimensions. Thus, the equation is actually extended into two dimensions.

[Equation 2]

$$H(z) = \frac{1}{2}(-1 + 2z^{-1} - z^{-2}) \quad (2)$$

The high frequency filter 132 may be configured to extract high frequency components using a transformation process, such as wavelet transformation or the like. The high frequency components of the input image that are extracted by the high frequency filter 132 are input to the high frequency counter 134. The high frequency counter 134 obtains values of the frequency components in the entire image of the high frequency component having passed through the high frequency filter 132. The high frequency counter 134 adds the values of the frequency components of each pixel corresponding to the obtained value of the frequency component that is greater than a predetermined threshold value (hereinafter, a high frequency threshold value). If the added value obtained by the addition process is lower than a predetermined threshold value (hereinafter, a high frequency added value), the high frequency counter 134 informs the alert generation unit 106 about the existence of a tampering action as a result of the Defocus detection. The high frequency threshold value and the high frequency added value can be set through the parameter setting unit 35 of the recorder 16.

The descriptions have so far been made to the function of the focus change detection unit 104. As described above, in this embodiment, the high frequency components of the input image, which are extracted by the high frequency filter 132, are used for the process for determining the tampering action. In the Global Motion detection, it is possible to detect the tampering actions on a zoom mechanism to some extent. It is difficult to detect a focus change through the Global Motion detection, however, when a focus change is made to a level where the existence of a moving person can be identified in the monitoring area, while the face is not identifiable. However, in combination with the Global Motion detection, it is possible to detect even the relatively small focus change, thus improving the detection accuracy of the tampering action.

(Alert Generation Unit 106)

Descriptions will now be made to the alert generation unit 106. As described above, to the alert generation unit 106, a result of the Global Motion detection by the image change detection unit 102 and a result of the Defocus detection by the focus change detection unit 104 are input. The alert generation unit 106 collectively determines the result of the Global Motion detection and the result of the Defocus detection so as to generate an alert to the recorder 16.

For example, the alert generation unit 106 counts the number of times an alert has been informed (hereinafter, number of GM informing times) as a result of the Global Motion detection in a predetermined period of time. The alert generation unit 106 sends an alert, when the number of GM informing times is greater than a predetermined threshold value (hereinafter, threshold value for number of GM informing times). The alert generation unit 106 counts the number of times (hereinafter, number of DF informing times) an alert is informed as a result of the Defocus detection within a predetermined period of time. The alert generation unit 106 generates an alert, when the number of DF informing times is greater than a predetermine threshold value (hereinafter, threshold value for number of DF informing times). The alert generation unit 106 may be configured to count both of the number of GM informing times and the number of DF informing times and to send an alert, when the number of GM informing times is greater than a threshold value for the number of GM informing times, and when the number of DF informing times is greater than the threshold value for number of DF informing times. In this manner, the conditions for sending an alert may appropriately be changed.

In the above-described configuration, the Global Motion detection and the Defocus detection are individually executed, and an alert is sent based on each of the results or both results. The Global Motion detection and the Defocus detection may be combined together. This enhances the detection accuracy of the tampering action, and decreases the processing load necessary for the tamper detection process. An example of such a combination of the Global Motion detection and the Defocus detection will now be described with reference to FIG. 6.

(2-2: (Modification) Fixed Tamper Detection Device 200)

Figure 6:
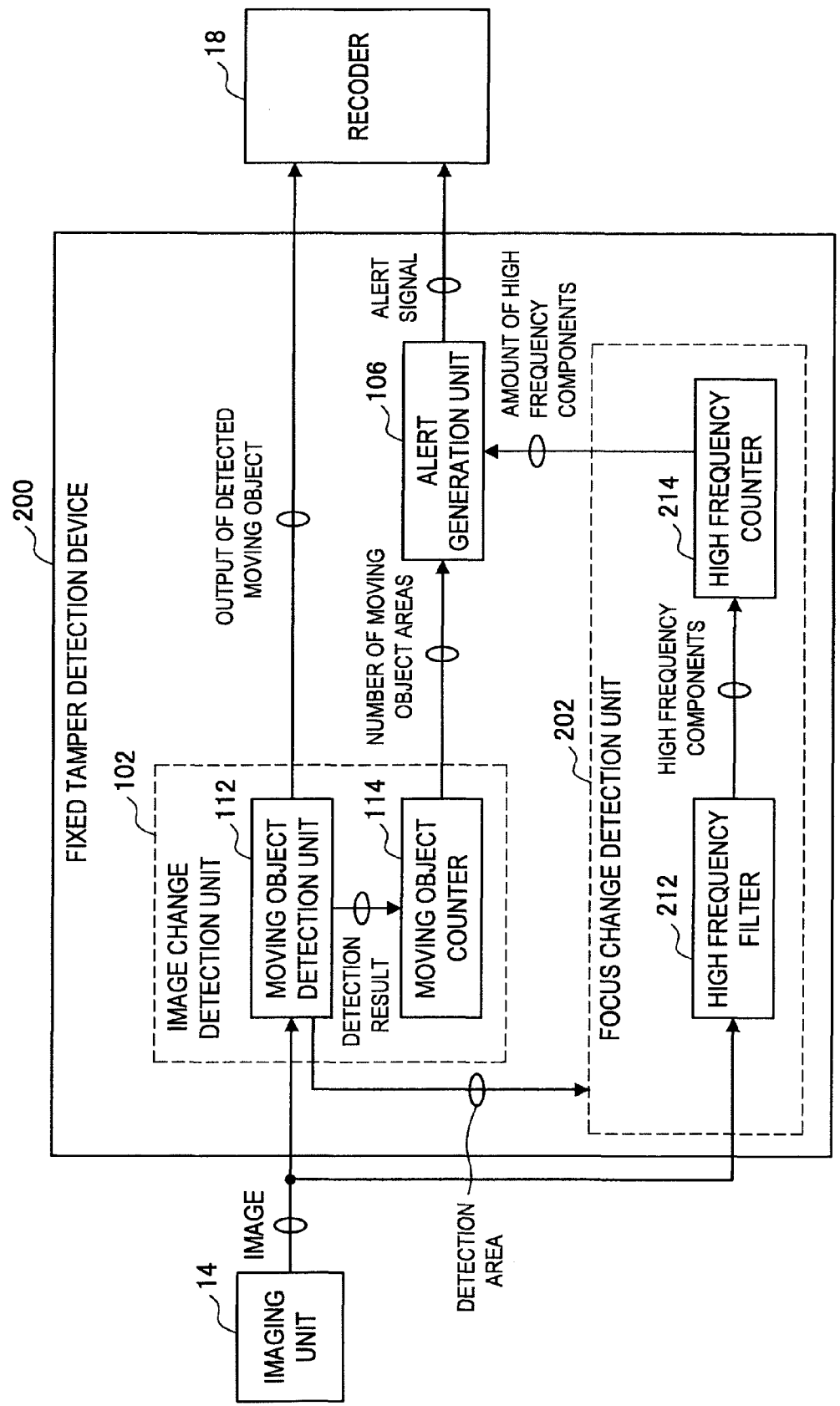
FIG. 6 is an explanatory diagram showing a modification of the fixed tamper detection device according to this embodiment.

FIG. 6 shows an example of a functional configuration of a fixed tamper detection device 200 according to a modification of this embodiment. The fixed tamper detection device 200 is formed by modifying a part of the fixed tamer detection device 100. Thus, the constituent elements having substantially the same function as those of the fixed tamper detection device 100 are identified with the same reference numerals, thereby will not specifically be described again. The major differences from the fixed tamper detection device 100 are that: a detection result of the moving object area by the moving object detection unit 112 is input to the focus change detection unit 202; and the Defocus detection is executed using the detection result. These differences will now mainly be described.

When an image is input from the imaging unit 14, the moving object detection unit 112 executes a moving object detection process. Information about the moving object area detected by the moving object detection unit 112 is input to the moving object counter 114 and the focus change detection unit 202. To the focus change detection unit 202, an image is input from the imaging unit 14, and information about the moving object area is input from the moving object detection unit 112. When an image is input to the focus change detection unit 202, the high frequency filter 212 extracts high frequency components of the input image. The image of the high frequency components extracted by the high frequency filter 212 is input to a high frequency counter 214. The high frequency counter 214 adds values of the frequency components corresponding to each pixel of the moving object area in the image of the high frequency component extracted by the high frequency filter 212, based on the information regarding the moving object area input from the moving object detection unit 112. At this time, like the high frequency counter 134, for each pixel greater than the high frequency threshold value, values of the high frequency components of the pixels are added.

In many cases, the high frequency components included in the captured image including the monitoring area are included more in a moving object as the foreground than in the background. Thus, upon execution of the Defocus detection with the focus on the moving object area, the accuracy of the Defocus detection can be enhanced. Because of the specific focus on the moving object area only rather than the broad focus on the entire image of the high frequency components, a narrow target range can simply be processed, thus reducing the processing load thereby. The above-described descriptions have given the configuration example for applying the high frequency filter 212 for the entire input image. However, in another configuration example, the high frequency filter 212 may be applied only a limited area of the moving object area. Then, a process for adding the high frequency component values may be executed using the output result. This decreases the processing load by the high frequency filter 212.

Upon addition of the values of the high frequency components, the high frequency counter 214 executes a process for determining a tampering action based on the added value. If the resultant value of the addition process is lower than a high frequency addition threshold value, the high frequency counter 214 informs the alert generation unit 106 about the existence of a tampering action as a result of the Defocus detection. To the alert generation unit 106, a result of the Global Motion detection is input from the moving object counter 114. The alert generation unit 106 determines whether there is a tampering action based on a result of the Defocus detection and a result of the Global Motion detection, and sends an alert based on the determination result.

The descriptions have been made to the functional configuration of the fixed tamper detection device 200. As described above, by executing the Defocus detection process using the moving object detection result, the accuracy of the Defocus detection process can be enhanced.

As described above, this embodiment is to suggest a technique for enhancing the accuracy of the tamper detection process, in combination of the Global Motion detection and the Defocus detection. The above-described technique is used suitably for the fixed monitoring device or the adjustable monitoring device at rest. Descriptions will now be made to a technique for detecting a tampering action performed during transfer, for an adjustable monitoring device.

3: ABOUT FUNCTIONAL CONFIGURATION OF ADJUSTABLE TAMPER DETECTION DEVICE 300

Descriptions will now be made to the functional configuration of the adjustable tamper detection device 300 according to this embodiment. Descriptions will be made first to an issue of the adjustable monitoring device. Then, descriptions will be made to an approach of this embodiment which has been proposed in order to solve such an issue. Descriptions will also be made to the flow of an interruption detection process by the adjustable tamper detection device 300.

[3-1: Issue of Adjustable Monitoring Device]

Descriptions will now be made to an issue of an adjustable monitoring device, with reference to FIGS. 7 and 8. FIG. 7 is an explanatory diagram showing an example of an environment where an adjustable monitoring device is installed (e.g. the IP camera 12). The IP camera 12 shown in FIG. 7 is the same as the IP camera 12 exemplarily shown in FIG. 1, and can turn at angles θ and φ. FIG. 8 is an explanatory diagram showing an example of a tampering action performed on the adjustable monitoring device.

Descriptions will now be made with reference to FIG. 7. As shown in FIG. 7, the IP camera 12 is often installed inside housing 20. The reasons why the housing 20 is provided are, for example, to prevent that an obstructer directly touches the IP camera 12, and to protect the IP camera 12 from an effect of a rainy wind or the like. In fact, because the housing 20 is provided, the possibility of intentional angle change of the IP camera 12 is decreased, and also the possibility of tampering with a zoom mechanism is decreased. However, as shown in FIG. 8, if the monitoring rage of the IP camera 12 temporarily changes as a result that the IP camera 12 turns, an area outside the monitoring range of the IP camera 12 will be left vulnerable.

Figure 8:
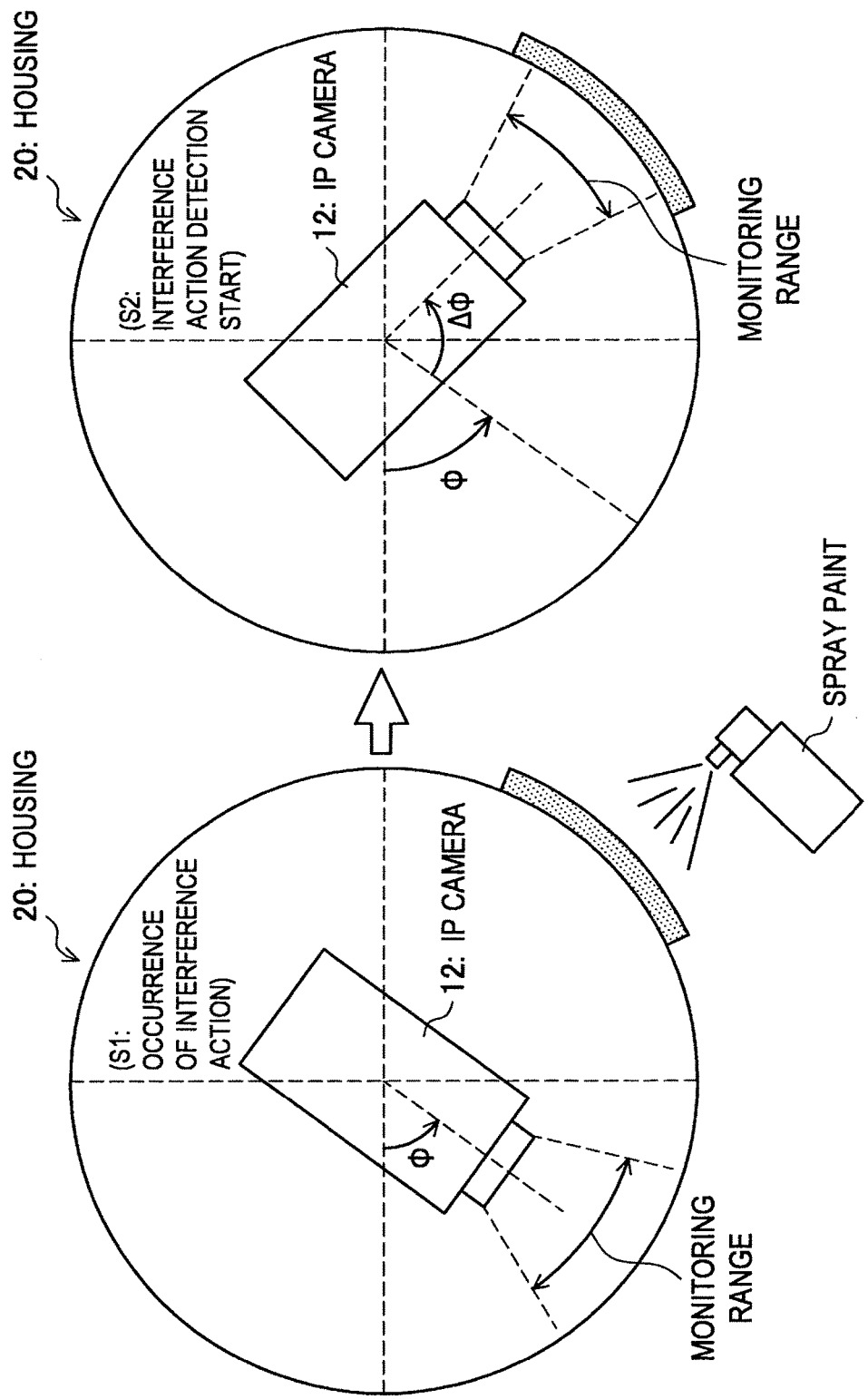
FIG. 8 is an explanatory diagram showing an example of an interference action detectable by an interference detecting method according to this embodiment.

FIG. 8 shows an example of a tampering action, when the monitoring range of the IP camera 12 is changed, of spraying paint in the monitoring range using a spray before the change. FIG. 8 shows a situation of a point S1 at which an interference action occurs and also a situation of a point S2 at which a process for detecting an interference action starts. At the point S1, the IP camera 12 faces in a φ direction, and monitors the monitoring range with a predetermined width mainly in the φ direction. Even if an area of the IP camera 12 outside its monitoring range is painted with a spray at the point S1, and a part of the housing 20 is masked, this action is not captured by the IP camera 12. Thus, the monitoring person is not aware of the tampering action using a spray paint.

Now, it is assumed that the IP camera 12 turns by Δφ, and faces at an angle "φ+Δφ", and its monitoring range shifts at an angle "φ+Δφ". At this time, the monitoring range at the angle "φ+Δφ" is masked with the spray paint sprayed toward the housing 20. Because the subject that exists in the monitoring range at the angle "φ+Δφ" is not captured, the monitoring person does not detect the entrance of any object into the monitoring range. Thus, a technique for detecting such a tampering action is necessary. Tamper detection techniques include, for example, the already-described Global Motion detection and Defocus detection techniques. In the adjustable monitoring device, when the IP camera 12 is at rest, the above detection processes function. That is, the detection process is executed based on an image of the already-masked monitoring range.

For example, the Global Motion detection is executed, in a state where the IP camera 12 faces at the angle "φ+Δφ". In this case, the IP camera 12 captures the mask of the spray paint applied to the housing 20, and obtains a difference value of each pixel included in the captured image. However, the image of the spray paint applied to the housing 20 does not temporarily change. Thus, the difference value corresponding to each captured image is not greater than a predetermined threshold value. As a result, the detection result by the Global Motion detection will usually be "no tampering action". When a spray paint is evenly applied to the housing 20, the captured image hardly includes the high frequency component. Therefore, the Defocus detection is effective. On the contrary, if a spray paint is unevenly applied, no tampering action may be possibly detected by the Defocus detection, depending on the setting of high frequency threshold value or high frequency addition threshold value.

For the above reasons, in the IP camera 12 used as an adjustable monitoring device, demanded is a technique for surely detecting a tampering action performed during transfer of the IP camera 12. In this embodiment, proposed is a technique for enabling to detect a tampering action performed during transfer of the IP camera 12 in a reliable manner. Descriptions will now be made to the adjustable tampering detection device 300 as one example of such a technique.

(3-2: Functional Configuration of Adjustable Tamper Detection Device 300)

Figure 9:
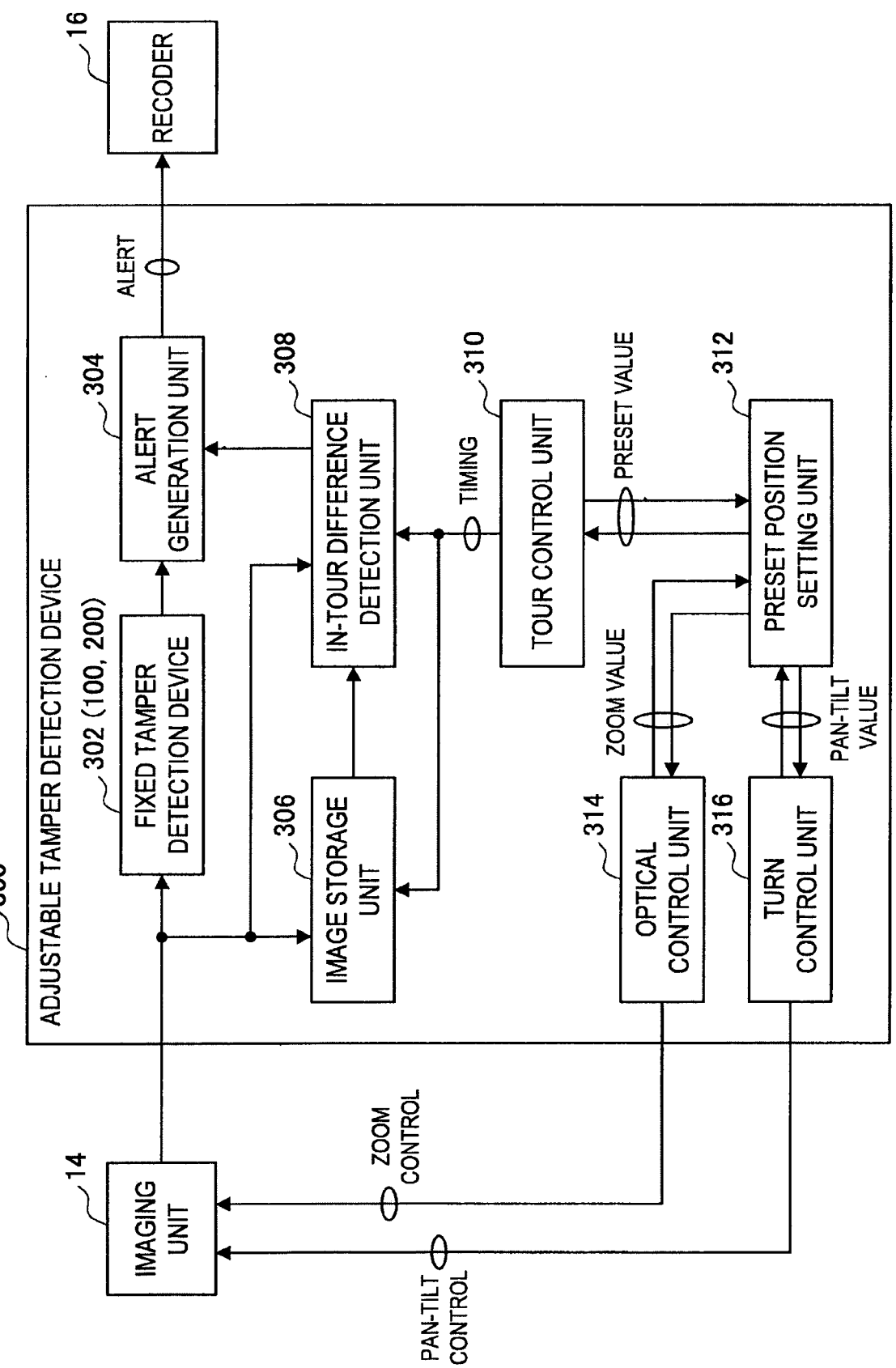
FIG. 9 is an explanatory diagram showing a functional configuration of an adjustable tamper detection device according to this embodiment.

Descriptions will now be made to a functional configuration of the adjustable tamper detection device 300 according to this embodiment. FIG. 9 is an explanatory diagram showing the functional configuration of the adjustable tamper detection device 300 according to this embodiment.

The adjustable tamper detection device 300 is mounted in the IP camera 12. The IP camera 12 can turn both at angles θ and φ, and has a zoom mechanism which can be realized by the imaging unit 14. Further, the IP camera 12 has a tour function. The tour function means a function for switching the monitoring angle or zoom value (hereinafter, monitoring condition) at a predetermined interval, so as to monitor a plurality of ranges and go the round. The monitoring condition is expressed in a combination of the angles at angles θ and φ and the zoom value, and includes a plurality of set combinations. Such combinations may be called "preset positions". In the following descriptions, the transfer between the monitoring conditions so as to go the round may simply be called "tour".

It is possible to arbitrarily set the length of the monitoring time in each preset position or the transfer speed between the preset positions. It is also possible to set a time period in which the tour is executed and a time interval at which the tour is executed. Usually, the transfer between the preset positions is often set at the maximum speed that can be realized with the turning mechanism (and the zoom mechanism) of the IP camera 12. Thus, the image captured during transfer blurs to such an extent that the image is not distinguishable by human eyes. It is difficult to perform imaging processing for the image during transfer. Thus, the Global Motion detection function or the Defocus detection function is suspended during transfer.

As shown in FIG. 9, the adjustable tamper detection device 300 has a fixed tamper detection device 302, an alert generation unit 304, an image storage unit 306, an in-tour difference detection unit 308 and a tour control unit 310. Further, the adjustable tamper detection device 300 has a preset position setting unit 312, an optical control unit 314 and a turn control unit 316. Note that the already-described fixed tamper detection device 100 or 200 may be used as the fixed tamper detection device 302.

If the IP camera 12 is rest at a particular preset position (hereinafter, a first preset position), a captured image is input from the imaging unit 14 to the fixed tamper detection device 302, the image storage unit 306 and the in-tour difference detection unit 308. The fixed tamper detection device 302 executes the Global Motion detection and the Defocus detection, and inputs the detection results to the alert generation unit 304. The image storage unit 306 stores an image captured at a predetermined timing in each preset position. The set predetermined timing is the point of time the IP camera 12 is reset in a preset position, or the point of time immediately before the IP camera 12 transfers to a next preset position. Needless to say, the predetermined timing may be set after a predetermined period of time elapses since the IP camera 12 is at rest.

The image storage unit 306 may be configured to decrease the resolution of a captured image, when the captured image is to be stored. The captured image stored in the image storage unit 306 is used for detecting a tampering action of masking the monitoring range. Thus, the captured image stored in the image storage unit 306 is enough to have such a resolution that a change between images can briefly be distinguished. To decrease the data size of the captured image, as described above, the image storage unit 306 lowers the resolution of the captured image and stores the image. The captured image stored in this manner in the image storage unit 306 is used by the in-tour difference detection unit 308.

The in-tour difference detection unit 308 compares an image (hereinafter, a past image) captured previously in a first preset position and stored in the image storage unit 306 with an image (hereinafter, a present image) captured in a present first preset position. When a tampering action is performed as exemplarily shown in FIG. 8, the past image and the present image should obviously differ. The in-tour difference detection unit 308 obtains a difference value between each pixel value of the past image and each pixel value of the present image, and determines that there is a tampering action when the obtained difference is greater than a predetermined threshold value.

To eliminate the influence of the luminance change due to a weather change or an illumination change, the in-tour difference detection unit 308 transforms the past image and the present image into an image format less likely to be affected by the above change, thereafter executing a comparison process. For example, the in-tour difference detection unit 308 transfers the past image and the present into edge images, thereafter executing a comparison process. As the IP camera 12 turns, the capture position of the past image may deviate from the capture position of the present image. To compensate for this deviation of the capture positions, the in-tour difference detection unit 308 adjusts the positions of the past image and the present image in accordance with a stabilizing process, and executes a comparison process thereafter. The past image, the present image and the moving object detection result of the same time are stored, and the moving object area is not used for the comparison. As a result, the accuracy of the comparison process can be improved in a crowded place. The comparison process by the in-tour difference detection unit 308 is enough to be executed at least once in each preset position. Preferably, the execution timing of the comparison process is immediately after the imaging unit 14 begins a capturing operation upon transfer of the IP camera 12 to a preset position.

If the in-tour difference detection unit 308 determines that there is a tampering action, the determination result is input to the alert generation unit 304. As described above, to the alert generation unit 304, a detection result by the fixed tamper detection device 302 is input, in addition to the detection result by the in-tour difference detection unit 308. The alert generation unit 304 sends an alert to the recorder 16, when the existence of a tampering action is represented in the detection result of the fixed tamper detection device 302 and in the detection result of the in-tour difference detection unit 308. As described above, the tamper detection process by the fixed tamper detection device 302 is to detect a tampering action generated mainly when the IP camera 12 is at rest. In the case of FIG. 8, however, a tampering action may be detected during transfer, in accordance with the Defocus detection. Thus, it is possible to enhance the detection accuracy by totally determining the existence of a tampering action in combination of the detection result by the fixed tamper detection device 302 and the detection result by the in-tour difference detection unit 308.

The tour function of the IP camera 12 is realized actually by the turning mechanism and the zoom mechanism of the imaging unit 14. A control process for each of the turning mechanism and the zoom mechanism of the imaging unit 14 is executed by the adjustable tamper detection device 300. Descriptions will now be made to constituent elements for the control function of the adjustable tamper detection device 300. The tour function of the IP camera 12 between the preset positions is executed in accordance with a control process by the tour control unit 310. The tour control unit 310 specifies a preset position at a predetermined timing, and inputs identification information (hereinafter, a preset value) regarding the specified preset position, to the preset position setting unit 312.

Candidates for the present position specified by the tour control unit 310 are set in advance in the preset position setting unit 312. Thus, the tour control unit 310 reads the candidates kept by the preset position setting unit 312, specifies a preset position therefrom set at each predetermined timing, and inputs the preset value to the preset position setting unit 312. The tour control unit 310 inputs information regarding the transfer timings between preset positions, into the image storage unit 306 and the in-tour difference detection unit 308. The image storage unit 306 stores an image captured before transfer, based on the timing information input from the tour control unit 310. The in-tour difference detection unit 308 detects a tampering action during transfer, from the captured image after the transfer and the past image stored in the image storage unit 306, based on the timing information input from the tour control unit 310.

When the tour control unit 310 inputs a preset value, the preset position setting unit 312 inputs information regarding the preset position specified with a preset value, into the optical control unit 314 and the turn control unit 316. Specifically, a zoom value set for the preset position is input to the optical control unit 314, while pan-tilt values (φ, θ) set for the preset position is input to the turn control unit 316. Upon reception of the input zoom value from the preset position setting unit 312, the optical control unit 314 controls an optical system of the imaging unit 14 to obtain the input zoom value. Upon reception of the input pan-tilt value from the preset position setting unit 312, the turn control unit 316 turns the angle of the imaging unit 14 to attain the input pan-tilt value.

As described above, the adjustable tamper detection device 300 controls the turning mechanism and the zoom mechanism of the imaging unit 14 using the tour control unit 310, so as to realize the controlling of tour between preset positions. The adjustable tamper detection device 300 can detect a tampering action performed in a tour, using the functions of the image storage unit 306 and the in-tour difference detection unit 308. Further, the adjustable tamper detection device 300 executes the Global Motion detection and the Defocus detection using the fixed tamper detection device 302, so as to detect a tampering action performed during the rest period in each preset position. As a result, it is possible to detect various tampering actions during transfer and rest period with high accuracy, by using the adjustable tamper detection device 300. This is highly effective on the crime-prevention.

(3-3: Method for Detecting Interference by Adjustable Tamper Detection Device 300)

Figure 10:
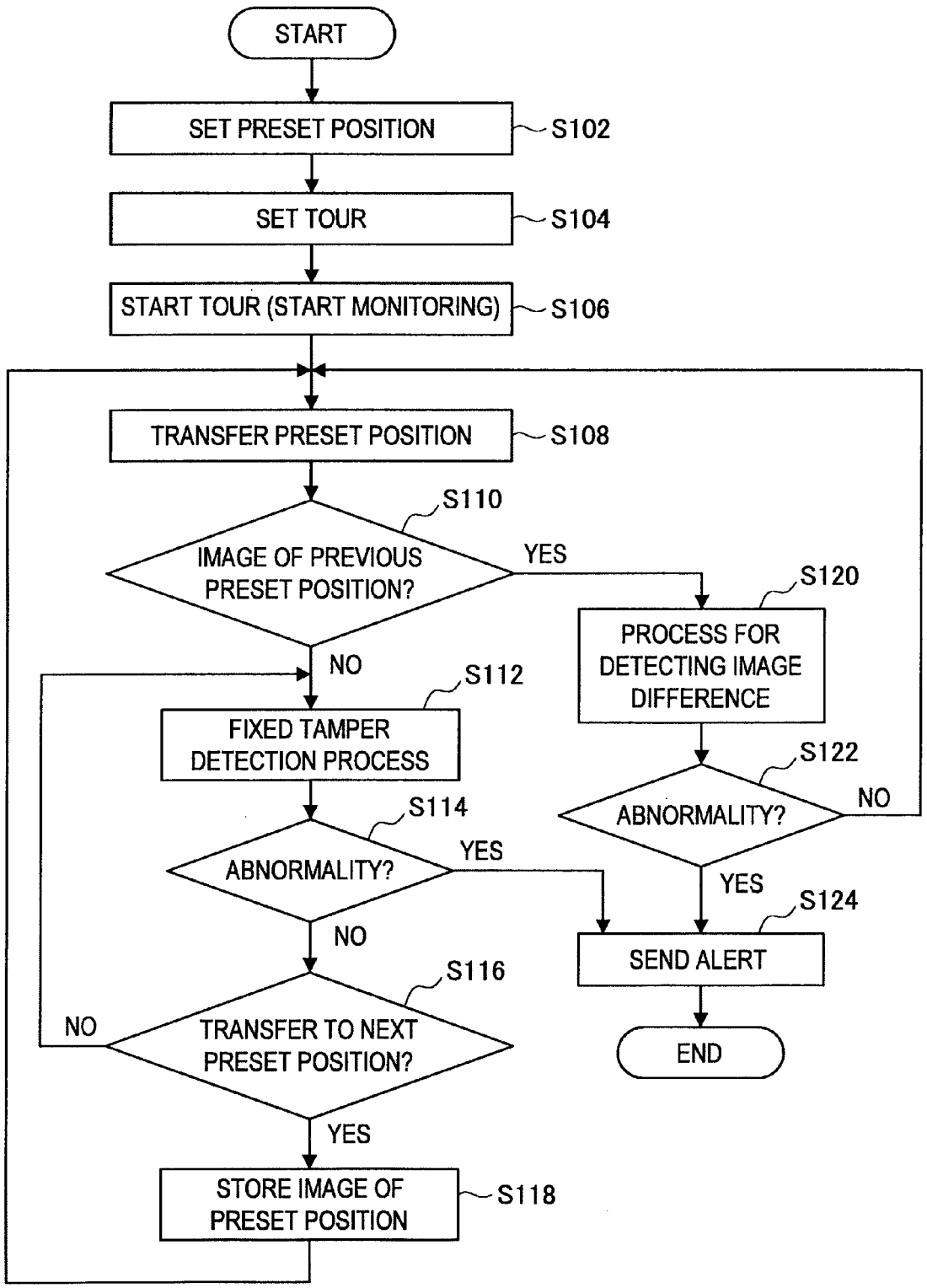
FIG. 10 is an explanatory diagram showing the flow of an interference detection process according to this embodiment.

Descriptions will now be made to a flow of an interference detection method by the adjustable tamper detection device 300 according to this embodiment. FIG. 10 is an explanatory diagram showing the flow of the interference detection method by the adjustable tamper detection device 300 according to this embodiment.

A plurality of preset positions are set (S102). The set values of the preset positions are set in the preset position setting unit 312. Now, the setting of the tour is made (S104). In this step, as the set value of the tour, the timing of switching the preset positions, and also its switching order and the like are set. The set value of the tour is set in the tour control unit 310. The tour begins (S106). When the tour begins, the fixed tamper detection device 302 executes the Global Motion detection and the Defocus detection in the set preset position (hereinafter, a first preset position), while the image storage unit 306 stores the captured image.

When it is time to transfer the preset position, the tour control unit 310 controls the transfer of the preset position (S108). When the IP camera 12 moves to the next preset position (hereinafter, a second preset position), the in-tour difference detection unit 308 determines whether the image (hereinafter, past image) captured previously in the second preset position is stored in the image storage unit 306 (S110). When there is stored the past image, the adjustable tamper detection device 300 proceeds to the process of Step S120. When there is no past image, the adjustable tamper detection device 300 proceeds to the process of Step S112.

When proceeded to the process of step S112, the fixed tamper detection device 302 executes the Global Motion detection and the Defocus detection (S112). It is determined whether an abnormality is found in the detection result of the fixed tamper detection device 302 (Step 114). When an abnormality is detected by the fixed tamper detection device 302, the adjustable temper detection device 300 proceeds to the process of step S124. When no abnormality is detected by the fixed tamper detection device 302, the adjustable tamper detection device 300 proceeds to the process of Step S116.

When proceeded to the process of step S116, the adjustable tamper detection device 300 determines whether it is time to transfer to the next preset position, in accordance with the tour control unit 310 (Step S316). If it is time to transfer to the next preset position, the adjustable tamper detection device 300 proceeds to the process of step S118. If it is not time to transfer to the next preset position, the adjustable tamper detection device 300 proceeds to the process of step S112 again. When proceeded to the process of step S118, the adjustable tamper detection device 300 stores the captured image in the second preset position in the image storage unit 306, and proceeds to the process of step S108 again (S118).

When proceeded to the process of step S120 in accordance with the determination process of step S110, the adjustable tamper detection device 300 compares the past image and the present image using the in-tour difference detection unit 308, and executes a tamper detection process based on a difference of both of the images (S120). It is determined whether there is an abnormality in the detection result of the in-tour difference detection unit 308 (S122). When an abnormality is detected by the in-tour difference detection unit 308, the adjustable tamper detection device 300 proceeds to step S124. When no abnormality is detected by the in-tour detection unit 308, the adjustable tamper detection device 300 proceeds to the process of step S108 again. When proceeded to the process of step S124, the adjustable tamper detection device 300 generates an alert in the alert generation unit 304 (S124), and ends the series of processes.

The descriptions have so far been made to the interference detection method according to this embodiment. As described above, the tamper detection process by the fixed tamper detection device 302 is combined with the tamper detection process by the in-tour difference detection unit 308, thereby detecting a tampering action in the preset positions and in the tour with high accuracy. It is therefore possible to cope with various tampering actions, thus enabling to effectively enhance the crime-prevention.

4: CONCLUSION

Finally, the functional configuration of the monitoring device according to this embodiment and an effect of the functional configuration will now briefly be summarized.

The functional configuration of the monitoring device according to this embodiment can be expressed as follows: This monitoring device has an imaging unit, a turning unit, an interference detection unit, a past image storage unit and a turning-period interference detection unit. The imaging unit is to capture an image. Note that this imaging unit can successively capture a plurality of images. That is, the imaging unit can capture not only a still image, but also motion images. The turning unit is to turn the angle of the imaging unit between a plurality of predetermined positions. In this case, the predetermined positions correspond to the preset positions, and correspond, for example, to the pan-tilt values included in the preset positions. Thus, the angle of the imaging unit is changed under the control of the turning unit. That is, the monitoring device has a tour function.

The interference detection unit is to detect an interference action based on an image sequence captured in one of the predetermined position. While the imaging unit faces a predetermined position, the interference detection unit is to detect an interference action performed in the monitoring range. In this case, the image sequence means a plurality of images successively captured by the imaging unit. The past image storage unit is to store an image captured before the imaging unit turns. The turning-period interference detection unit is to detect an interference action during the turn, using an image captured in a predetermined position before the turn and an image stored in the past image storage unit, when the imaging unit turns back to a predetermined position before the turn, after the image is stored in the past image storage unit.

As described above, the image before the turn is stored in the past image storage unit, it is possible to compare the images before and after the turning in the same predetermined position. Like the turning-period interference detection unit, it is possible to determine whether an interference action has been performed during the turn, by comparing an image stored in the past image storage unit in a predetermined position with an image captured after turning back to the same position from the turn. Note that it does not matter how the imaging unit turns, after the image is stored in the past image storage unit.

When the imaging unit turns after the image is stored in the past image storage unit in a first predetermined position, and it turns back to the first predetermined position all the round through a second and third predetermined positions, the predetermined position before the turn is the first predetermined position. It is assumed that the touring around the predetermined positions is performed in the order of, for example, the first, second, third, first, second and first positions. In this case, the turning-period interference detection unit may use the firstly-stored image as the past image for use in detecting an interference action, or may use an image stored in the first predetermined position as the fourth passing point. Needless to say, a plurality of past images may be used in the process for detecting the interference action.

The monitoring device may be configured as follows. For example, the interference detection unit may include a following high frequency filter and an interference action determination unit. The high frequency filter is to extract a high frequency component from an image captured in the one of the predetermined positions. The interference action determination unit is to determine whether there is an interference action, when a value of the high frequency component extracted through the high frequency filter is lower than a predetermined threshold value.

When a zoom mechanism is mounted in the imaging unit, it is difficult to detect a moving object entering a monitoring range, if the focus shifts as a result of tampering with this zoom mechanism. It is possible to detect a focus change, by extracting high frequency components of a captured image through the high frequency filter and also monitoring an amount of high frequency components included in the captured image. Normally, if the focus shifts, an object has a vaguely outline, and an edge part is blurred. That is, an amount of high frequency components included in the image is decreased. It is possible to detect an interference action on the zoom mechanism with high accuracy, by comparing the value of the high frequency component(s) with a predetermined threshold value, like the interference action determination unit. Even when the monitoring range is evenly masked, the amount of high frequency components is remarkably low. It is possible to detect an interference action, such as masking the monitoring range using paint, by using the high frequency component as an interference detection criterion.

The interference detection unit may further include a moving object detection unit which detects an area including a moving object based on an image sequence captured in the one predetermined position. In this case, the interference action determination unit determines that there is an interference action, when a value of the high frequency component(s) corresponding to an area detected by the moving object detection unit is lower than a predetermined threshold value. That is, this configuration is to pay attention to a moving object area obtained by a moving object detection process. Normally, many high frequency components are included in the moving object area. Thus, the detection accuracy can be enhanced by performing the interference detection based on the amount of the high frequency components included in the moving object area. Further, if a target area in an image to be processed through the high frequency filter and the interference action detection unit narrows, an amount of calculation necessary for the process can be decreased.

The past image storage unit may be configured to transform and store an image with a resolution lower than that of the image used for detecting an interference action by the interference action detection unit. In this case, the turning-period interference detection unit detects an interference action performed during turning of the imaging unit, using the low resolution image stored in the past image storage unit. With this configuration, the amount of data of the past image stored in the past image storage unit can be decreased, thus saving the storage area for storing the past image. As described above, the past image stored in the past image storage unit is used for the comparison between images before and after the turn. This image is performed for detecting an action, such as masking the monitoring range with paint during the turn and covering the monitoring rage with a cover. The image used for the image comparison process is not necessary to have a high resolution as long as it can briefly be distinguished. Thus, as described above, it is preferred to configure that the past image is stored with a low resolution.

The turning-period interference detection unit may be configured to detect an interference action during the turn upon comparison of images, after adjusting positions of an image captured in a predetermined position before the turn and an image stored in the past image storage unit. Ideally, turn control is performed by the turning unit such that the angle of the imaging unit coincides with a predetermined position. However, in fact, the angle of the imaging unit may somehow shift before and after the turn. Therefore, if the angle of the imaging unit shifts, there is a possibility of occurrence of mis-detection, when the image comparison is performed before and after the turn. At the former stage of executing an image comparison process, positions of target images to be compared are adjusted, and the comparison process is performed using the images after position adjustment, thereby enhancing the detection accuracy.

The interference detection process by the imaging device can be summarized as follows. This interference detection process is performed by the imaging unit which turns between a plurality of predetermined positions to capture an image, and includes a step of capturing an image in one of the plurality of positions, an interference detection step of detecting an interference action based on an image sequence captured in the one of the plurality of positions, a past image storage step of storing an image captured before the imaging unit turns, when the imaging unit turns from the one of the plurality of positions to another one of the predetermined positions, and a turning-period interference detection step of detecting an interference action during the turn based on the image captured in a predetermined position before the turn and the image stored in the past image storage step, when the imaging unit turns to the another one of the predetermined positions and turns back to the predetermined position again before the turn, after the image is stored in the past image storage step. According to this configuration, it is possible to detect not only an interference action performed while the imaging unit is at rest in a predetermined position, but also an interference action performed during the turn of the imaging unit, with high accuracy.

The monitoring device may be configured also as follows. The monitoring device has a following imaging unit, a moving object detection unit, a high frequency filter and an interference action determination unit. The imaging unit is to capture an image. The moving object detection unit is to detect a moving object based on an image sequence captured by the imaging unit. The high frequency filter is to extract high frequency components from the image captured by the imaging unit. Further, the interference action detection unit is to detect that there is an interference action, when a value of the high frequency component extracted through the high frequency filter is lower than a predetermined threshold value, or when the number of moving objects detected by the moving object detection unit is larger than a predetermined threshold value.

As described above, when a zoom mechanism is mounted in the imaging unit, the monitoring action may be interfered as a result of tampering with this zoom mechanism. This interference action may somehow be detected by the Global Motion. However, if the focus remarkably shifts, the interference action may hardly be detected by the Global Motion detection. To meet this demanded, there is a technique for detecting the focus change and determining the interference action. For this demand, the monitoring device has a technique for detecting a tampering action on the zoom mechanism, based on the high frequency component(s) included in the captured image as a criterion of the interference detection.

Specifically, examples of such a technique include the high frequency filter and the interference action detection unit. If the focus shifts, the subject is vaguely-outline, and the edge part is blurred. That is, the high frequency components included in the captured image become few. The monitoring device extracts high frequency components from the captured image through the high frequency filter, and executes a process for determining an interference action in accordance with the interference action detection unit based on the amount of the high frequency components. As a result, it is possible to detect an interference action with high accuracy, while the interference action is hardly detected by the Global Motion detection process. It is possible to decrease mis-detection of the interference action, in combination of the interference detection result based on the high frequency components and the detection result by the moving object detection unit.

An interference detection process performed by the monitoring device can be summarized as follows. The interference detection process includes an imaging step of capturing an image, a moving object detection step of detecting a moving object based on an image sequence captured in the imaging step, a high frequency component extraction step of extracting a high frequency component from the image captured in the imaging step, and an interference action determination step of determining that an interference action exists when a value of the high frequency component extracted in the in the high frequency component extraction step is lower than a predetermined threshold value, or when the number of moving object detected in the moving object detection step is greater than a predetermined threshold value. According to this configuration, it is possible to detect an interference action regarding a focus change with high accuracy, though it is difficult to detect the interference action by the Global Motion detection.

(Remarks)

The turn control unit 316 is an example of the turning unit. The above-descried fixed tamper detection devices 100 and 200 are examples of the interference detection unit. The image storage unit 306 is an example of the past image storage unit. The in-tour difference detection unit 308 is an example of the turning-period interference detection unit. The high frequency counter 134 and the alert generation unit 106 are examples of the interference action determination unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-302280 filed in the Japan Patent Office on 27 Nov. 2008, the entire content of which is hereby incorporated by reference.

What is claimed is:

1. A monitoring device comprising:
an imaging unit which images an image and turns from a first position to a second position;
a past image storage unit which stores a past image imaged before the imaging unit turns from the first position; and
a signal processor and a memory having instructions stored therein, the instructions, when executed by the processor, cause the processor to operate as a turning-period interference detection unit which detects an interference of the imaging unit during turning movement of the imaging unit between the first position and the second position by comparing pixel values of the stored past image that was imaged at the first position before the imaging unit turns from the first position to the second position, with pixel values of a present image imaged in the first position after the imaging unit turns back to the first position from the second position, and obtaining difference values based on the comparison;

wherein the past image is stored in the past image storage unit before imaging the present image, and wherein the interference is detected when the difference values exceed a predetermined threshold.

2. The monitoring device according to claim 1, wherein the instructions when executed by the processor, cause the processor to further operate as an interference detection unit which detects the interference based on an image sequence captured between turns of the imaging unit.

3. The monitoring device according to claim 2, further comprising:
   a high frequency filter which extracts a high frequency component from an image imaged in a predetermined position,
   wherein the instructions when executed by the processor, cause the processor to further operate as an interference action determination unit which determines that there is an interference, when a value of the high frequency component extracted by the high frequency filter is lower than a predetermined threshold value.

4. The monitoring device according to claim 2, wherein the instructions when executed by the processor, cause the processor to further operate as:
   a moving object detection unit which detects an area including a moving object based on an image sequence imaged in a predetermined position; and
   an interference action determination unit which determines that there is an interference, when a value of a high frequency component corresponding to the area detected by the moving object detection unit is lower than a predetermined threshold value.

5. A monitoring device comprising:
   a turning imaging unit which images an image;
   an image storage unit which stores a first image imaged before the imaging unit turns from a first position; and
   a signal processor and a memory having instructions stored therein, the instructions, when executed by the processor, cause the processor to operate as a turning-period interference detection unit which detects an interference of the imaging unit during turning movement of the imaging unit between the first position and a second position by comparing pixel values of the stored first image that was imaged at the first position before the imaging unit turns from the first position to the second position, with pixel values of a present image imaged in the first position after the imaging unit turns back to the first position from the second position, and obtaining difference values based on the comparison;

wherein the image storage unit stores the first image before imaging the present image, and wherein the interference is detected when the difference values exceed a predetermined threshold.

6. An interference detection method comprising the steps of:
   storing a first image imaged before an imaging unit turns, when the imaging unit turns from a first position to a second position;
   comparing pixel values of the stored first image that was imaged at the first position before the image unit turns from the first position to the second position, with pixel values of a present image imaged in the first position after the imaging unit turns back to the given predetermined position;
   obtaining difference values based on the comparison;
   detecting an interference of the imaging unit during the turning movement of the imaging unit between the first position and the second position when the difference values exceed a predetermined threshold,
   wherein the first image is stored before imaging the present image.

7. The interference detection method according to claim 6, further comprising:
   imaging an image by the imaging unit; and
   turning the imaging unit such that the imaging unit moves between a plurality of predetermined positions comprising the first position and the second position.

* * * * *